United States Patent [19]

Loescher

[11] Patent Number: 5,749,121
[45] Date of Patent: May 12, 1998

[54] WHEEL AND HOUSING FOR TABLE LEG

[75] Inventor: William A. Loescher, Redding, Conn.

[73] Assignee: Howe Furniture Corporation, Trumbull, Conn.

[21] Appl. No.: 816,252

[22] Filed: Mar. 13, 1997

[51] Int. Cl.[6] .......................... A47B 91/00; B60B 33/00
[52] U.S. Cl. ........................ 16/43; 16/30; 16/42 T
[58] Field of Search ............................ 16/43, 19, 30, 16/38, 39, 31 R, 31 A, 42 R, 42 T

[56] References Cited

U.S. PATENT DOCUMENTS

| | | | |
|---|---|---|---|
| 2,644,978 | 7/1953 | Becker | 16/42 T |
| 2,716,774 | 9/1955 | Kilmer | 16/42 R |
| 3,069,719 | 12/1962 | Ridge | 16/30 |
| 3,796,169 | 3/1974 | Bales et al. | 16/42 R |

Primary Examiner—Chuck Mah
Attorney, Agent, or Firm—Ware, Fressola, Van der Sluys & Adolphson LLP

[57] ABSTRACT

A wheel assembly for the tubular end of the horizontal member of an inverted T-shaped table leg comprises a cylindrical housing which plugs into the tubular end. A recess in the housing opens through its cylindrical wall at an opening which subtends an angle of less than 180°. A wheel is mounted within the recess on an axle pin which is parallel to, and displaced from, the longitudinal axis of the housing.

6 Claims, 1 Drawing Sheet

WHEEL AND HOUSING FOR TABLE LEG

TECHNICAL FIELD

This invention pertains to the field of furniture manufacture. More particularly, it relates to an improved wheel and housing for use on a table having an inverted T-shaped table leg.

BACKGROUND ART

A common table construction employs a table leg in the shape of an inverted T. Most commonly, both elements of the T are metal tubes. If such tables include wheels or rollers, they are customarily mounted to the ends of at least one of the horizontal T members. One advantage of applying wheels to only one of the T legs is that the table can be readily moved by simply lifting the opposite end. It is an object of the present invention to provide a wheel and housing of simplified construction and neat appearance which can be easily installed on such a horizontal T leg member. Other objects, features, and advantages will become apparent from the following description and appended claims.

DISCLOSURE OF INVENTION

A substantially cylindrical housing defines an internal recess which extends through the cylindrical side of the housing via an opening subtending an arc less than 180° about the longitudinal axis of the housing. An axle pin is carried by the housing, parallel to but offset from such longitudinal axis, and a wheel is mounted on the axle pin. A unitary plug extends coaxially from the housing and is insertable into the open tubular leg member of an inverted T-leg table.

BEST MODE FOR CARRYING OUT THE INVENTION

Figure 1:
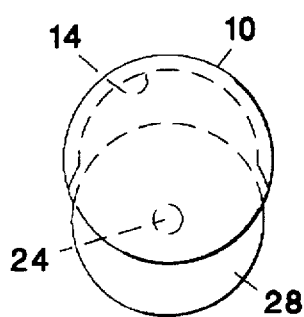
FIG. 1 is a left-end view of a wheel and housing in accordance with the invention.
Figure 2:
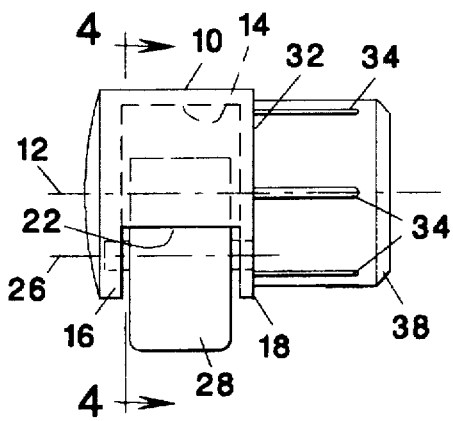
FIG. 2 is a front elevational view of the wheel and housing of FIG. 1.
Figure 3:
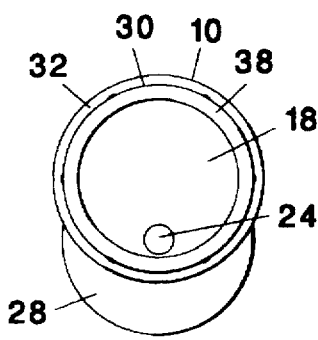
FIG. 3 is a right-end view of the wheel and housing of FIG. 2.
Figure 4:
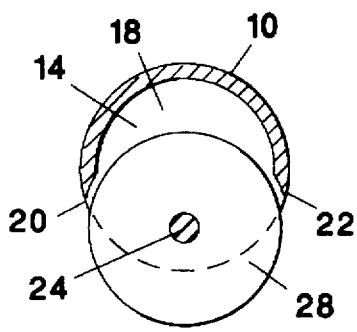
FIG. 4 is a cross-section taken substantially along the line 4—4 of FIG. 2.

FIGS. 1–4 illustrate the major features of the housing and wheel of this invention. The housing 10 is in the form of a right circular cylinder about a longitudinal axis 12. The housing defines a cylindrical recess 14 therein, said recess being defined by an outer end wall 16 and an inner end wall 18. The recess 14 extends through the cylindrical side wall of the housing 10 to form an opening bounded by a first edge 20 and a second edge 22 which subtend an arc of less than 180°. An axle pin 24 is mounted by its ends in the outer end wall 16 and the inner end wall 18 as is best seen in FIG. 2. It will be noted that the longitudinal axis 26 of the axle pin is parallel to the longitudinal axis 12 of the housing 10 but is displaced downwardly therefrom a distance less than the radius of the cylindrical housing 10.

Mounted upon the axle pin 24 is a wheel 28. The wheel 28 is rotatable on the axle pin 24 and extends outwardly from the housing 10 through the opening defined by the first edge 20 and the second edge 22.

Extending upwardly from the inner end wall 18 of the housing 10 is a tubular plug 30 in the form of a right circular cylinder which is coaxial with the housing 10 along the longitudinal axis 12. Preferably, the radius of the cylindrical plug 30 is less than the radius of the housing 10 by an amount sufficient to form a shoulder 32 having a width approximating the thickness of the tubular leg of the table. The external surface of the plug 30 may carry a plurality of thin raised ribs 34 for the purpose of enhancing a press fit within the table leg.

Figure 5:
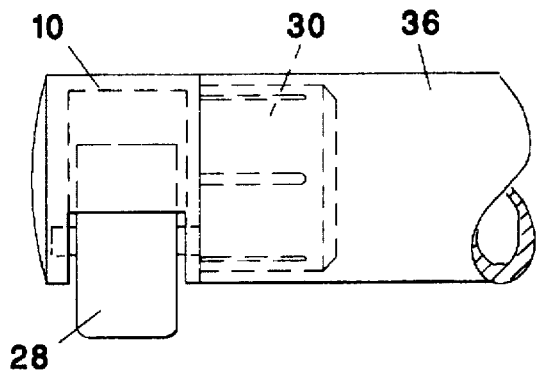
FIG. 5 is a front elevational view of the wheel and housing of the invention inserted in the tubular end of an inverted T table leg.

FIG. 5 illustrates the horizontal member 36 of an inverted T table leg. As will be apparent from FIG. 5, the plug 30 is forcefully inserted into the end of the horizontal member 36. This may be facilitated by a chamfer 38 on the end of the plug. If necessary, the housing 10 may be further secured by means of a screw extending through the horizontal member 36 and into the plug 30, preferably at a location at the bottom of the horizontal member 36.

Figure 6:
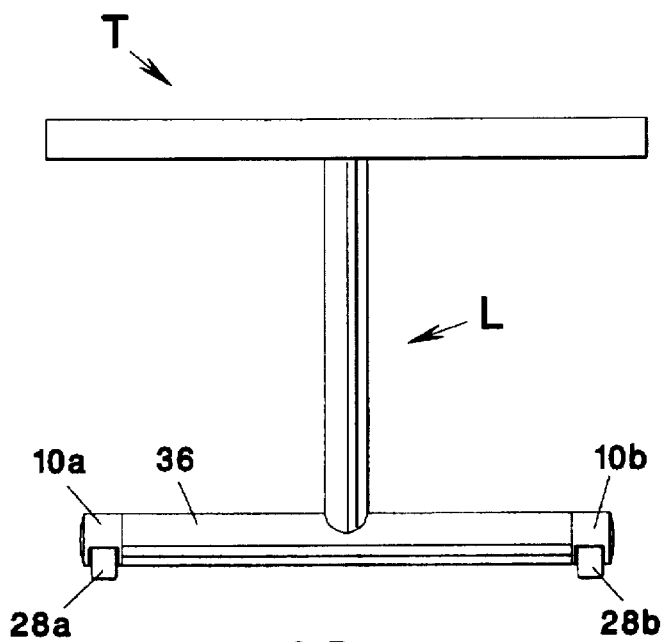
FIG. 6 is an end view of a table having an inverted T-leg carrying the wheel and housing of the invention.

FIG. 6 illustrates a table T having an inverted T leg L carrying horizontal member 36. Mounted in each end of the horizontal member is a housing 10a, 10b, each with a wheel 28a, 28b, in accordance with the invention.

It is believed that the many advantages of this invention will now be apparent to those skilled in the art. It will also be apparent that a number of modifications and variations may be made therein without departing from its spirit and scope. Accordingly, the foregoing description is to be taken as illustrative only, rather than limiting. This invention is limited only by the scope of the following claims.

I claim:

1. A wheel and housing mountable onto the tubular end of the horizontal portion of an inverted T-shaped table leg which comprises:

a substantially right circular cylindrical housing having a central longitudinal axis and defining a recess therein extending through a side of said housing as an opening subtending an arc less than 180° about said longitudinal axis;

an axle pin extending through said housing parallel to said longitudinal axis and spaced therefrom a distance less than the radius of said housing and substantially centrally of said opening;

a wheel rotatably mounted on said axle pin within said housing and extending through said opening; and a substantially right circular cylindrical plug extending from, and coaxial with, said housing, said plug being insertable into said said tubular end.

2. The wheel and housing of claim 1 wherein said plug has a radius less than the radius of said housing.

3. The wheel and housing of claim 2 wherein the difference between the radius of the housing and the radius of said plug is approximately the thickness of said tubular end.

4. In a table having at least one inverted T-shaped table leg including a horizontal member terminating in first and second tubular ends, the improvement which comprises:

a first substantially right circular cylindrical housing having a central longitudinal axis and defining a recess therein extending through a side of said first housing as an opening subtending an arc less than 180° about said longitudinal axis;

a first axle pin extending through said housing parallel to said longitudinal axis and spaced therefrom a distance less than the radius of said first housing and substantially centrally of said opening;

a first wheel rotatably mounted on said first axle pin within said first housing and extending through said opening; and a first substantially right circular cylindrical plug extending from, and coaxial with, said first housing, said first plug being inserted into said first tubular end.

5. The improvement of claim 4 further comprising:

a second substantially right circular cylindrical housing having a central longitudinal axis and defining a recess therein extending through a side of said second housing as an opening subtending an arc less than 180° about said longitudinal axis;

a second axle pin extending through said second housing parallel to said longitudinal axis and spaced therefrom a distance less than the radius of said second housing and substantially centrally of said opening;

a second wheel rotatably mounted on said second axle pin within said housing and extending through said opening; and a second substantially right circular cylindrical plug extending from, and coaxial with, said second housing, said second plug being inserted into said second tubular end.

6. The improvement of claim 5 wherein the longitudinal axes of said first and second housings are coaxial.

* * * * *